(12) United States Patent
Kallabis et al.

(10) Patent No.: US 7,954,248 B2
(45) Date of Patent: Jun. 7, 2011

(54) ARRANGEMENT FOR DEPICTING A LINEAR MARKING

(75) Inventors: Gabriel Kallabis, Spirkelbach (DE); Andreas Weber, Wilgartwiesen (DE)

(73) Assignee: Stabila Messgerate Gustav Ullrich GmbH, Annweiler (DE)

( * ) Notice: Subject to any disclaimer, the term of this patent is extended or adjusted under 35 U.S.C. 154(b) by 466 days.

(21) Appl. No.: 12/254,539

(22) Filed: Oct. 20, 2008

(65) Prior Publication Data

US 2009/0113731 A1    May 7, 2009

(30) Foreign Application Priority Data

Nov. 1, 2007  (DE) .................... 20 2007 015 265 U

(51) Int. Cl.
*F21S 8/00* (2006.01)

(52) U.S. Cl. .................. 33/286; 33/DIG. 21; 362/147

(58) Field of Classification Search .............. 362/147, 362/259, 296.01, 327; 33/286, 1 PT, 1 N, 33/281–282, DIG. 21
See application file for complete search history.

(56) References Cited

U.S. PATENT DOCUMENTS

| | | | |
|---|---|---|---|
| 3,984,154 A | 10/1976 | Chin et al. | |
| 4,693,599 A | 9/1987 | Margulis et al. | |
| 5,782,093 A | 7/1998 | Yamashita et al. | |
| 6,502,319 B1 | 1/2003 | Goodrich et al. | |
| 6,577,388 B2 * | 6/2003 | Kallabis | 356/139.1 |
| 6,694,629 B2 * | 2/2004 | Goodrich | 33/286 |
| 6,935,034 B2 | 8/2005 | Malard et al. | |
| 7,252,411 B2 * | 8/2007 | Busam et al. | 362/327 |
| 7,345,828 B2 | 3/2008 | Pawlowski et al. | |
| 7,771,074 B2 * | 8/2010 | Kallabis et al. | 362/147 |

FOREIGN PATENT DOCUMENTS

| | | |
|---|---|---|
| DE | 19953114 | 2/1997 |
| DE | 10217108 | 12/2002 |
| DE | 20304114 | 5/2003 |
| DE | 202004007476 | 9/2004 |
| EP | 1795863 | 6/2007 |
| JP | 2004094123 | 3/2005 |

* cited by examiner

*Primary Examiner* — G. Bradley Bennett
*Assistant Examiner* — Tania C Courson
(74) *Attorney, Agent, or Firm* — Dennison, Schultz & MacDonald

(57) ABSTRACT

An arrangement for depicting a linear optical marking on a surface, including a radiation source emitting light, such as laser radiation, as well as a first lens arranged in the beam path having a first and a second surface penetrated by the radiation, of which one surface features a parabolic or elliptical trace at least partially in cross section, formed of curved sections of different radii, the trace extending symmetrically with respect to a plane of symmetry of the lens, along which runs the beam directed in parallel, preferably by means of a second lens. In order to achieve a uniform power distribution along the line, it is proposed that the first surface formed of sections with different radii faces the radiation.

20 Claims, 5 Drawing Sheets

US 7,954,248 B2

ARRANGEMENT FOR DEPICTING A LINEAR MARKING

BACKGROUND OF THE INVENTION

The invention concerns an arrangement for depicting a linear optical marking on a surface, such as a periphery such as a wall surface of a room, comprising a radiation source emitting light or laser radiation, as well as a first lens arranged in the optical path having a first and a second surface penetrated by the radiation, of which one surface consists at least in part of curved sections with different radii in cross section, having in particular an at least partially parabolic or elliptical trace in cross section, and extends symmetrically with respect to the plane of symmetry of the first lens, along which the parallel radiation travels.

DE-A-102 17 108 discloses a laser irradiating apparatus which is used in the construction industry. In order to generate a line without interruption running across a wide angle, it is provided that a laser beam bundle passing through a collimator lens falls on a rod lens, which has a semitransparent surface on the light source side, in order to reflect a linear light beam in the direction of the light source. The non-reflected light passes thus through a completely transparent surface of the rod lens, which faces away from the light source, and is refracted in order to generate a linear light beam in a second direction, which is opposite from the first direction.

U.S. Pat. No. 6,502,319 provides several cylindrical lenses or mirrors, by means of which the light beam emitted by the light source is distributed to the required extent, in order to depict a line of visible light on a surface, which starts directly in front of a housing where the light source is accommodated.

Light beam leveling devices according to DE-U-203 04 117 and DE-U-203 04 114 have line lenses consisting of sections with different focal lengths in front of a light source, by which a linear light beam is to be generated.

DE-C-199 53 114 proposes the use of two lateral projection devices arranged side by side, each comprising a light source and an optical unit arranged in its beam path, for the purpose of generating two lines intersecting at a right angle on a workpiece under an optical marking system. In order to spread the light beam, U.S. Pat. No. 3,984,154 provides a lens which has the shape of a hollow cylinder section, on whose one edge surface a collimator laser beam impinges. The inner surface of the lens has a reflecting layer for the purpose of reflecting the light to a sufficient extent to the outside.

In JP-A-2004094123, a rod lens, whose outer surface is provided in sections with a reflecting layer, so that the impinging light is directly reflected, is utilized to generate linear markings. Light can pass through the lens in the areas in which a corresponding reflection layer is not provided.

A lens utilized according to U.S. Pat. No. 6,935,034 to spread a laser beam features a rectangular geometry with a rounded edge facing away from the light source for the purpose of achieving the desired spread of the light that passes through the lens.

A crossline laser is disclosed in EP-A-1 795 863. The lenses used have a first planar surface on which the laser impinges in order to then be refracted on the surface, which is elliptical in cross section and faces away from the beam, whereby an optical line is generated, which is projected as a marking on a surface. The intensity distribution along the line is not uniform. Rather, the intensity is greater in the central area of the line and decreases towards the outside.

A laser beam impinges on the flat rear side of a half-cylinder lens in order to linearly spread a laser beam according to U.S. Pat. No. 5,782,093.

A refractive-diffractive hybrid lens for forming a beam of high power diode lasers is known from DE-A-103 54 780. The lens is composed of a rectangular section and a cylindrical section, through which the light passes first.

An apparatus for depicting a linear optical marking according to DE-U-20 2004 007 476 features a channel-shaped lens, whose curved sections run along both sides of a plane which extends perpendicularly to the radiation impinging the lens.

According to DE-A-195 28 198, a laser beam impinges on a cylindrical lens in order to be linearly depicted by the latter on sensors, with which the intensity distribution of the laser beam is measured.

SUMMARY OF THE INVENTION

It is an object of the invention to further develop an arrangement of the initially mentioned kind in such a way that a line can be generated, which is relatively long and features a uniform intensity distribution over a wide area, in particular a more uniform intensity distribution than that of the known arrangements.

The object is attained according to the invention essentially in that the first surface composed of sections having different radii faces toward the radiation.

As a deviation from the known lenses, which refract a light bundle to a line, that is, spreading lenses featuring a flat side, the refraction according to the invention is carried out at two contours, that is, surfaces, of which the first is curved, whereby not only a more uniform intensity distribution along the line is obtained, but a considerably longer line is generated in comparison with lenses of the same size, in which a refraction occurs only at one surface.

The uniformity of the light intensity along the line according to the invention also has the advantage that more power can be incorporated overall into the laser line, without exceeding the laser safety class already in the central area of the line.

It is particularly provided that the light source—if required with an associated optical unit—emits an elongated elliptical light bundle, whose longitudinal axis runs vertical to the plane of symmetry. Here the light bundle should impinge on the first surface while it is symmetrically distributed with reference to the axis of symmetry, whereby preferably the relationship of the longitudinal extension L of the light beam with respect to the transversal extension B of the lens vertically to the plane of symmetry is $2:3 \leq L:B \leq 1:1$. If higher losses or a worse efficiency factor can be tolerated, then values deviating from those above can of course also be considered.

Furthermore, the first surface is characterized in that the light bundle impinges fully on the first surface at a distance from the vertex of the first surface, wherein $0.5 \, L \leq a \leq 1.5 \, L$, with L=length of the light bundle.

In order to optimize the generated optical line, the first surface should in addition be curved in such a way that the maximum refraction angle $\alpha$ amounts to $50° \leq \alpha \leq 80°$, in particular $55° \leq \alpha \leq 70°$.

The first surface should have a radius of curvature r1 at the vertex, with $0.45 \, mm \leq r1 \leq 1.1 \, mm$. The values are dependent upon the material and refraction index, so that other value ranges can also be taken into consideration.

In order to prevent a blurred appearance of the optical line, it is provided that the first surface is depicted with reduced reflection or is provided with a corresponding layer.

In order to achieve a further uniformity of the intensity of the line, a preferred further development of the invention provides that the second surface is curved or arched, wherein a concave or convex trace is considered. The second surface is formed in particular by a section of a cylindrical surface.

The second surface can have a radius of curvature r2, with $15 \, mm \leq r2 \leq 25 \, mm$.

The invention provides in addition that a laser light source, such as a laser diode emitting polarized light, is utilized as light source. Radiation that is polarized parallel to the longitudinal axis of the elliptical light bundle should especially be used. The invention is not abandoned, however, when polarization is vertical to the longitudinal axis of the light beam.

The lens itself can be made of plastic, in particular in the form of a cast part.

In a further development, the invention provides that the second surface has a diffractive configuration or is provided with a diffractive element.

The invention is characterized in particular by a crossline laser device in which a first arrangement according to the invention for generating a first linear optical marking and a second arrangement according to the invention for generating a second linear optical marking, which is vertical to the first linear optical marking, is arranged as a unit in a housing, which oscillates or is adjustable in dependence upon gravitational forces or by means of a motor.

BRIEF DESCRIPTION OF THE DRAWINGS

Further details, advantages and features of the invention are disclosed, not only in the claims, the features inferred therefrom—per se or in combination—but also from the following description of the embodiments represented in the drawings.

In the drawings.

DESCRIPTION OF THE PREFERRED EMBODIMENTS

Figure 1:
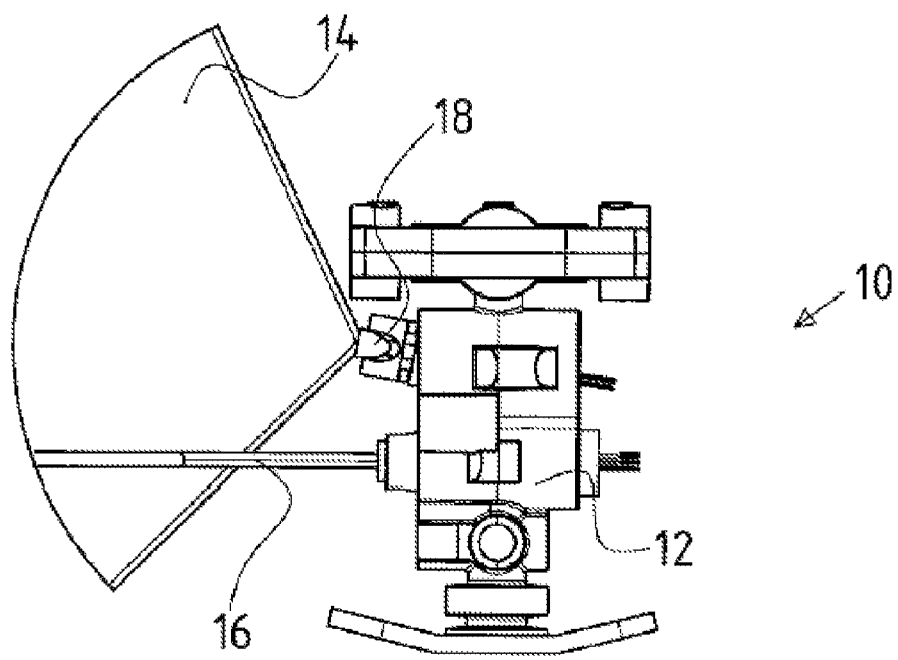
FIG. 1 shows a lateral view of a crossline laser device.
Figure 2:
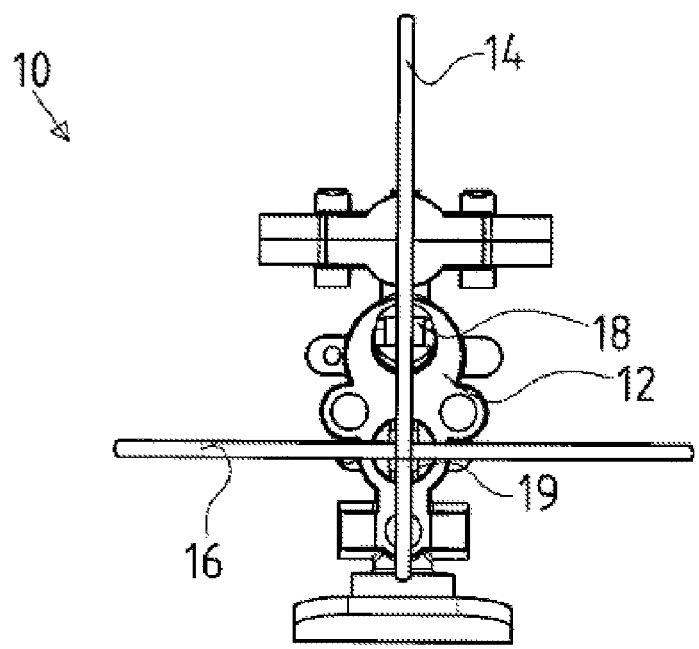
FIG. 2 shows a frontal view of the crossline laser device of FIG. 1.

Line or crossline laser devices are used in order to depict lines or intersecting lines as auxiliary lines for work to be carried out, especially in the construction field. FIGS. 1 and 2 show purely schematically an arrangement of a line or crossline laser device oscillating suspended within a housing, which arrangement comprises light sources such as laser sources, in particular laser diodes with an optical unit connected upstream, which can be generally designated a pendulum 10. The pendulum 10 proceeds from a bearing 12. In a crossline laser, two lines 14, 16, which intersect each other at an angle of 90° and can be projected onto a surface, are then generated by means of light sources, such as laser diodes and the upstream optical unit, through especially shaped lenses.

For this purpose, the beam emitted by the laser light source, such as a laser diode, is directed toward the lens 18, 20, by means of which the laser beam is refracted in order to form the lines 14, 16.

Figure 9:
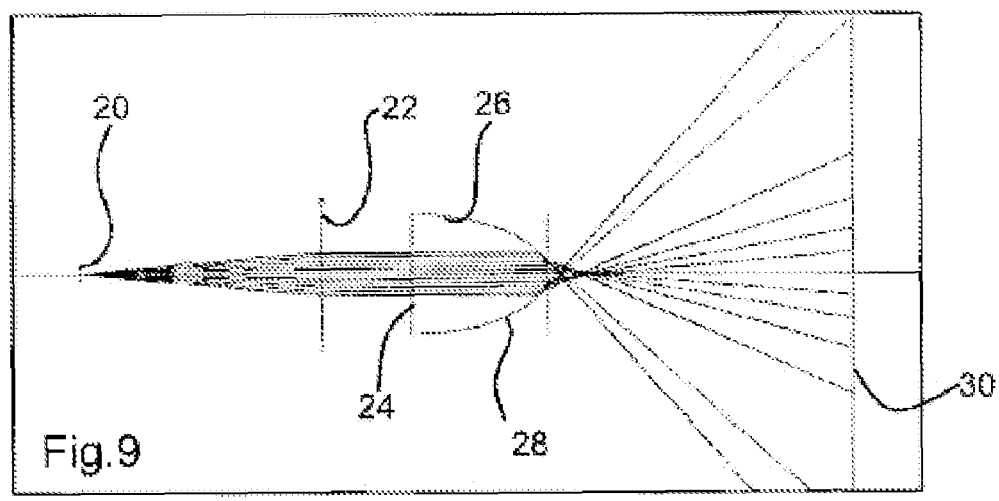
FIGS. 9-11 show schematic representations of beams which pass through lenses according to the state of the art.
Figure 10:
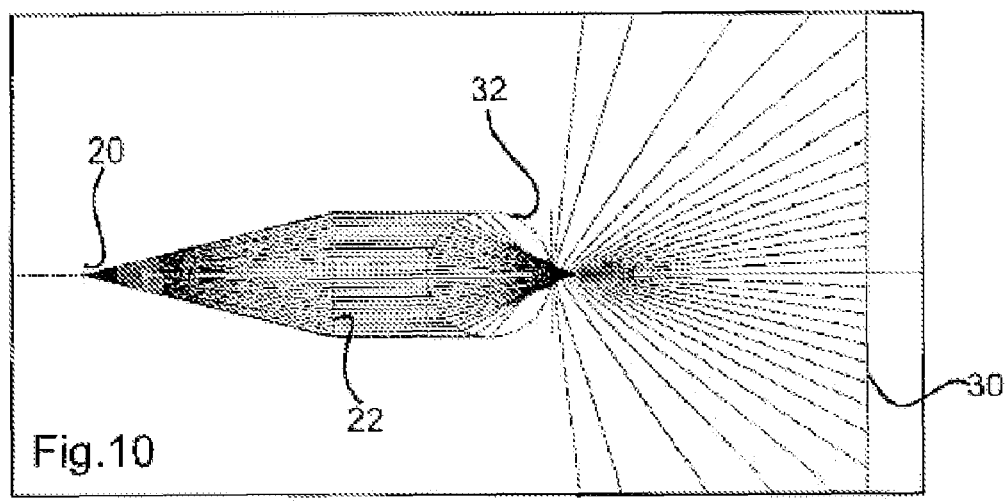
Figure 11:
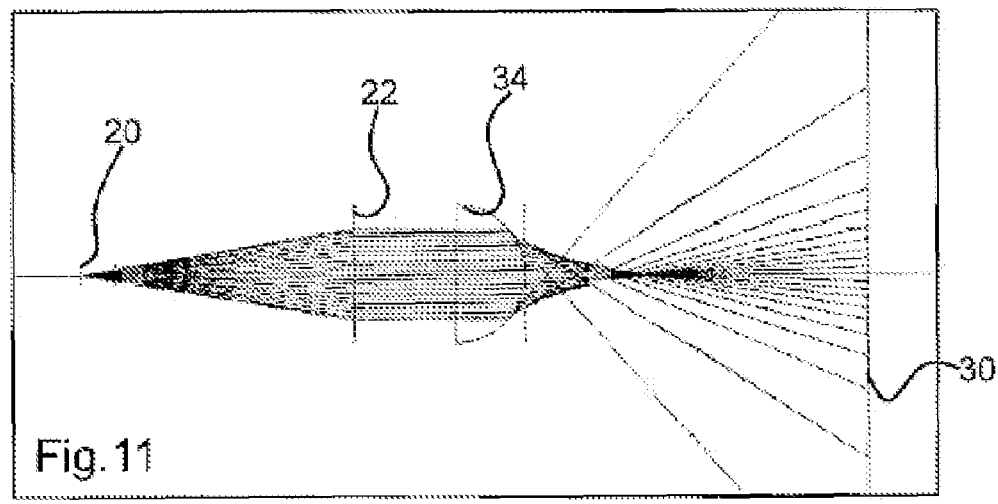

Lenses utilized according to the state of the art are represented purely schematically in FIGS. 9-11 with the associated beam paths. The same reference numerals are used therein to identify identical elements.

The beam originating from a laser source 20, such as a laser diode, is aligned in parallel by means of a lens 22 in order to pass vertically through a boundary surface 24 of a lens 26, which has on its rear a surface 28 consisting of sections with mutually differing curvature radii and having an elliptical shape especially in cross section. A lens such as this, which corresponds to EP-A-1 795 863, consequently effects a refraction of the beam only at one contour, namely on the curved surface 28. In this way a line 30 is produced, for example on a wall surface, which shows an irregular power or intensity distribution, as should be illustrated purely schematically by means of the spaces of the beams.

A cylindrical lens 32 is shown in FIG. 10, on which a bundle of parallel beams impinges, wherein a refraction caused by the cylindrical geometry takes place, such that the line 30 projected on a surface likewise varies in intensity along its longitudinal axis, that is, it is considerably weaker in the margin area than in the central area. A corresponding cylindrical lens is known, for example, from DE-A-102 17 108.

A lens 34 according to FIG. 11, which is formed by a cylindrical section, likewise shows an irregular intensity distribution along the line 30, as should be conveyed schematically by the spacing of the individual beams. The intensity is many times greater than in the border area in comparison to the embodiments of FIGS. 9-10. A corresponding lens is known, for example, from U.S. Pat. No. 5,782,003.

Figure 4:
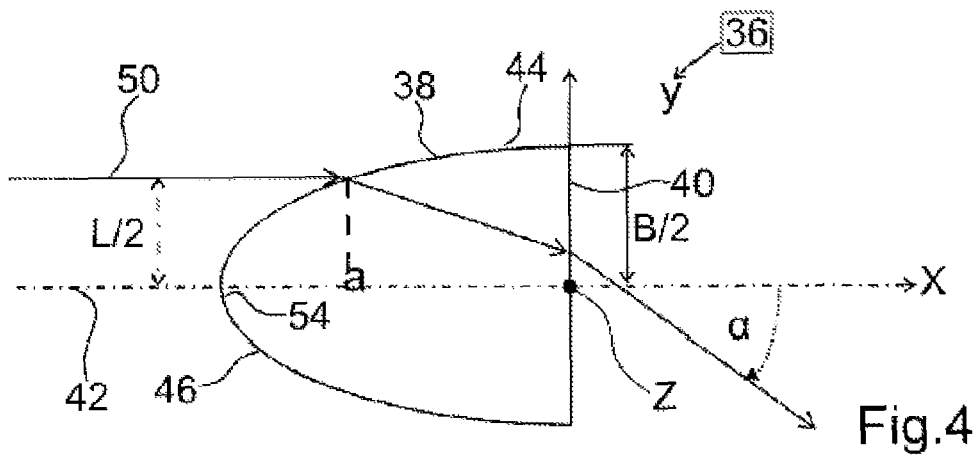
FIG. 4 shows a schematic representation of a beam path through a lens according to the invention.
Figure 6:
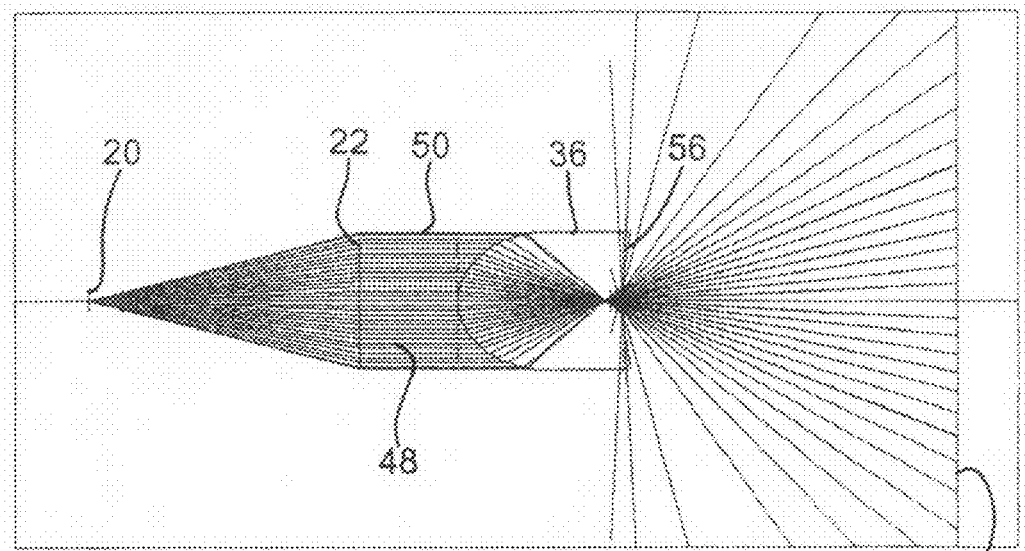
FIG. 6 shows a schematic representation of the beam path through an embodiment of a lens according to the invention.
Figure 7:
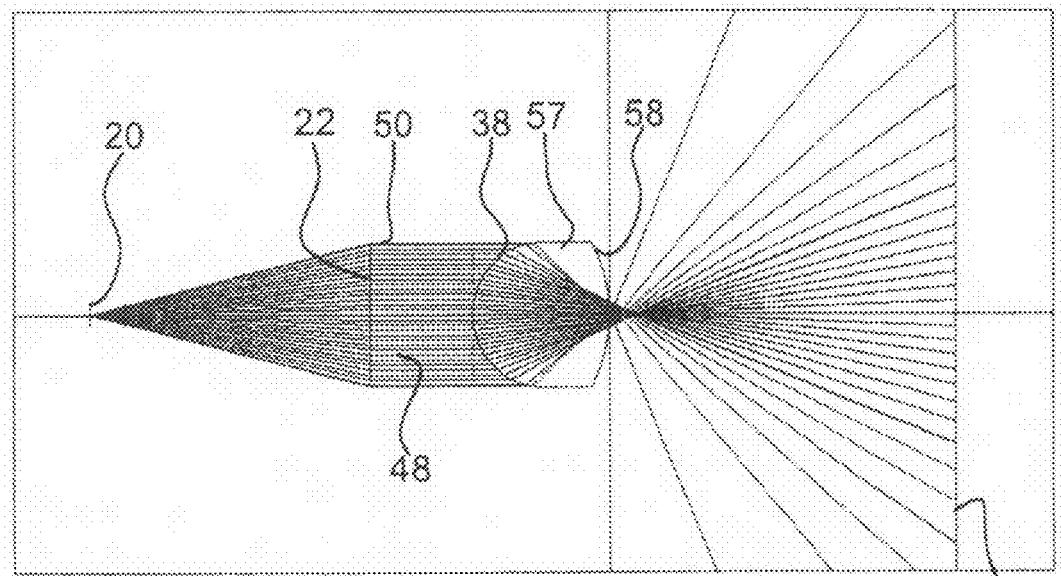
FIG. 7 shows a schematic representation of a beam path through a further embodiment of a teaching of the invention.

A lens 36 for generating a linear optical marking featuring two refracting contours according to FIGS. 4, 6 and 7, that is surfaces 38, 40, of which the surface facing the beam consists of sections of different curvature radii and has an almost hyperbolic or elliptical shape in cross section, is proposed according to the invention. This can be seen purely schematically in the figures. The corresponding surface 38, which is also called the first surface, is composed of areas 44, 46 that run symmetrical to the plane of symmetry 42.

If a Cartesian coordinate system with X, Y and Z axes, wherein the Z axis is vertical to the drawing plane, is plotted on the lens 36, both the first and the second surface 38, 40 have X and Y coordinates, which are respectively independent of the Z coordinates in at least one section of the Z axis. The first surface 38 features sections with different radii in the X-Y plane of the coordinate system.

Figure 5:
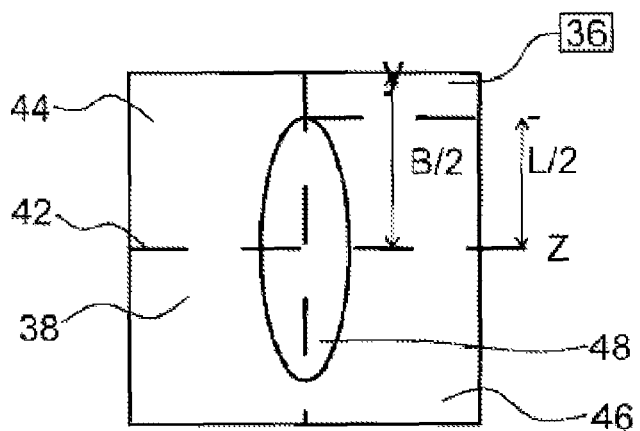
FIG. 5 shows a frontal view of the lens of FIG. 4.

The beam bundle originating from a light source, such as a laser diode 20, according to the representation shown in FIGS. 9-11, consists of beams running parallel to the X axis and therewith to the plane of symmetry 42 with respect to the X-Z plane, which impinge on the first surface 38, that is, the areas 44 46 that are symmetrical with respect to the plane of symmetry 42. In agreement with the representation of FIG. 5, which shows a front view of the lens 36, that is, a plan view of the surface 38 with the sections 44, 46, the beams form a beam bundle 48 having an elliptical cross section, whose longitudinal axis is aligned along the Y axis, that is, vertically to the plane of symmetry 42. The outer marginal beams, that is, the beams 50 that form the vertices of the beam bundle 48, should have a distance L with respect to each other, that is, a distance L/2 from the X axis or plane of symmetry 42, which is smaller than the maximum width B of the lens 36 transversely to the plane of symmetry 42, that is, along the Y axis. This maximum width is predetermined by the rear side surface 40. Only the upper marginal beam 50 is shown in the drawing.

L is preferably about ⅔ of B or greater, even though the beam bundle 48 can have a length which is equal to the width of the lens 36 according to the schematic representation of FIGS. 6 and 7.

Particularly uniform intensity distributions can be obtained when the light bundle 48 fully impinges on the surface 38 at the distance a from the vertex 54 of the surface 38, whereby especially $0.5 \leq a \leq 1.5$ L.

The surface 38 is preferably curved in such a way that the refraction angle α of the marginal beams 50 is between 50° and 80°, in particular between 55° and 70°. In addition, the surface 38 in the vertex 54 should feature a curvature r1 of between 0.45 mm and 1.1 mm.

Figure 3:
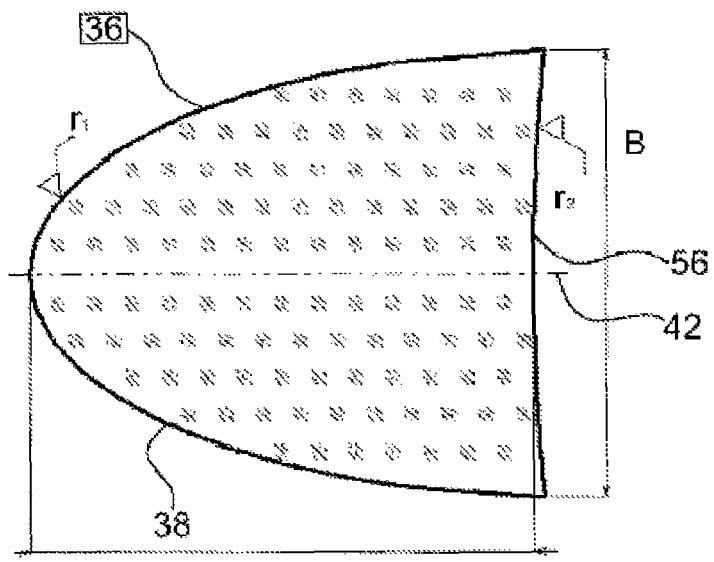
FIG. 3 shows a cross section through a lens according to the invention.

If the rear side surface 14 has a planar configuration according to the representation of FIG. 4, then the lens 36 is can be provided with a rear surface 56 according to the schematic representation of FIG. 3, which features a concave trace, that is, it is curved inwardly. The surface 56 should likewise be symmetrical to the plane of symmetry 42 and should have a radius of between 19 mm and 21 mm.

Typical dimensions of the lens 36 can be inferred from FIG. 3. The lens can thus feature a height H between 4 and 7 mm in X direction, whereas the width B is between 4 mm to 6 mm. The first surface 38 can be provided in addition with an anti-reflective coating in order to minimize the reflection of beams on the surface.

FIGS. 6 and 7 should illustrate the schematic trace of the beams, which are refracted by means of a lens according to the invention, in order to project a line 30 on a surface, which line features a uniform intensity distribution along its length. The lens shown in FIG. 6 corresponds to that of FIG. 3 and is identified with reference numeral 36.

A lens 57, which can be seen in FIG. 7, is comparable to the first surface 38 of the previously described lens 36. On the other hand, the second surface 58 facing away from the beam has a convex shape, and can have a radius of curvature of between 15 and 25 mm.

It also becomes clear from FIGS. 6 and 7 that the surface 36 does not generate a focal point, but a focal line, which can be located inside, outside, or both inside and outside of the lens 36.

It is also possible, independently of this, to provide the second surface 40, 56, 58 with a diffractive configuration or with a diffractive element.

Figure 8:
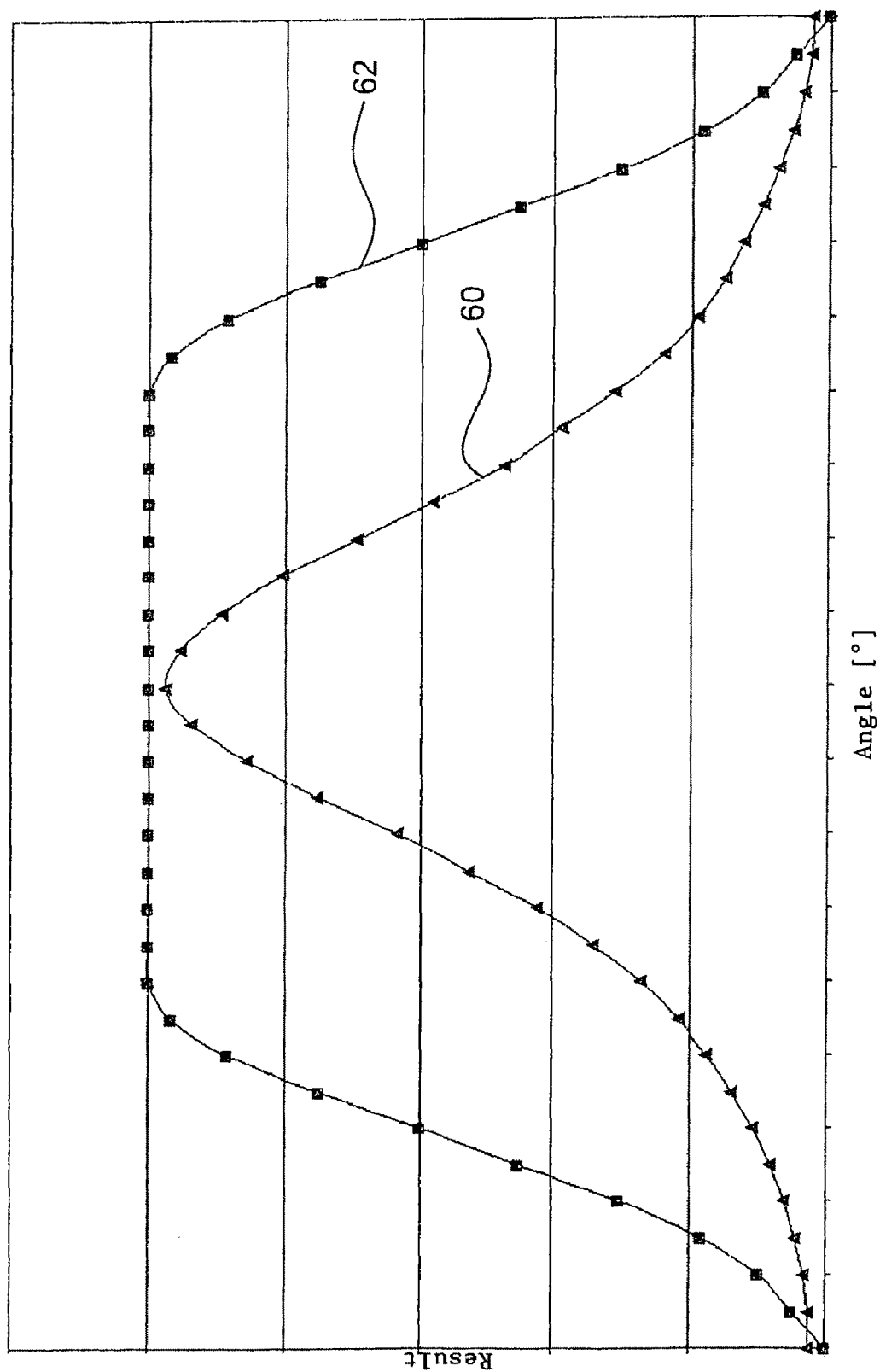
FIG. 8 shows intensity distributions of beams distributed by means of lenses.

It should become clear with reference to FIG. 8 that a uniform intensity distribution along the line 30 can be achieved with the lenses 36, 38 according to the invention. The curve 60, which is formed by the filled triangles, thus represents an intensity distribution of a cylindrical lens, as can be seen in FIG. 11. It can be perceived that the intensity decreases sharply from the center of the curve 60 towards the outside. Consequently, if one intends to attain sufficient intensity in the margin area of the line, the intensity would be so strong in the central area that it could possibly represent a danger to the user. On the other hand, intensity that remains the same over a large angular range can be obtained for a line that can be projected with a lens 36, 38 according to the invention, as is conveyed by the curve 62 represented by filled squares. The advantage is thus obtained that more power can be introduced over the entire line; with the consequence that sufficient intensity is also attained in a greater angular range, without having to exceed the laser safety class in the central area. There is thus no danger to a user.

What is claimed is:

1. An arrangement for depicting a linear optical marking on a surface, such as a peripheral surface such as a wall surface of a room, comprising a radiation source (20) emitting a light or laser beam, as well as a first lens (18, 20, 36, 57) arranged in the beam path having a first and a second surface (38, 40, 44, 46, 56, 58) penetrated by the beam, of which one surface features a parabolic or elliptical trace at least partially in cross section, comprised of curved sections of different radii, said trace extending symmetrically with respect to a plane of symmetry (42) of the lens, along which runs the beam directed in parallel, preferably by means of a second lens (22), wherein the first surface (38) comprising sections with different radii faces the beam.

2. The arrangement of claim 1, wherein the second surface (40) is planar and vertical to the plane of symmetry (42).

3. The arrangement of claim 2, wherein the second surface (40, 56, 58) has a diffractive configuration or is provided with a diffractive element.

4. The arrangement of claim 1, wherein the second surface (56, 58) is curved or arched.

5. The arrangement of claim 4, wherein the second surface (56, 58) is concavely arched.

6. The arrangement of claim 4, wherein the second surface (58) is convexly arched.

7. The arrangement of claim 4, wherein the second surface (56, 58) is a section of a cylindrical surface.

8. The arrangement of claim 4, wherein the second surface (56,58) has a radius of curvature r2, with 15 mm≦r2≦25 mm.

9. The arrangement of claim 1, wherein the radiation source (20) possibly with the second lens (22) generates an elongated elliptical light bundle (48), whose longitudinal axis is vertical to the plane of symmetry (42).

10. The arrangement of claim 9, wherein the light bundle (48), which is distributed symmetrically with respect to the plane of symmetry (42), impinges on the first surface (36).

11. The arrangement of claim 9, wherein the relationship of the longitudinal extension L of the light bundle (48) with respect to the width B of the lens (36) vertical to the plane of symmetry (42) is 2:3≦L:B≦1:1.

12. The arrangement of claim 9, wherein the first surface (38) is curved in such a way that the light bundle (48) impinges fully on the first surface at a distance a from the vertex (54) of the first surface, wherein 0.5 L≦a≦1.5.

13. The arrangement of claim 9, wherein the first surface (38) is curved in such a way that the outer marginal beams that form the vertex of the beam bundle (48) are refracted in such a way that the refraction angle α with respect to the plane of symmetry (42) is 50°≦α≦80°, in particular 55°≦α≦70°.

14. The arrangement of claim 1, wherein the radiation source (20) emits polarized light, such as laser light.

15. The arrangement of claim 14, wherein, the laser light is polarized in parallel or vertically to the longitudinal axis of the light bundle (48).

16. The arrangement of claim 1, wherein the first surface (38) has a radius of curvature r1, with 0.45 mm≦r1≦1.1 mm, in the vertex (54).

17. The arrangement of claim 1, wherein the first surface (38) has an anti-reflective configuration or is provided with an anti-reflective layer.

18. The arrangement of claim 1, wherein the lens (36, 57) is made of plastic.

19. The arrangement of claim 1, wherein the lens (36, 57) is a die cast component.

20. A crossline laser measuring device comprising the arrangement of claim 1, for generation of a first linear optical marking (14) and a second arrangement of at least one of the preceding claims for generation of a second linear optical marking (16), which is vertical to the first linear optical marking, whereby the first arrangement and the second arrangement are arranged as a unit in a housing of the crossline laser measuring device, which can oscillate or be adjustable in dependence on gravitational forces or by means of a motor.

* * * * *